(12) United States Patent
Cunha et al.

(10) Patent No.: US 10,234,140 B2
(45) Date of Patent: Mar. 19, 2019

(54) GAS TURBINE ENGINE WALL ASSEMBLY WITH ENHANCED FLOW ARCHITECTURE

(71) Applicant: United Technologies Corporation, Farmington, CT (US)

(72) Inventors: Frank J. Cunha, Avon, CT (US); Stanislav Kostka, Shrewsbury, MA (US)

(73) Assignee: United Technologies Corporation, Farmington, CT (US)

( * ) Notice: Subject to any disclaimer, the term of this patent is extended or adjusted under 35 U.S.C. 154(b) by 113 days.

(21) Appl. No.: 15/039,108

(22) PCT Filed: Dec. 31, 2014

(86) PCT No.: PCT/US2014/072928
§ 371 (c)(1),
(2) Date: May 25, 2016

(87) PCT Pub. No.: WO2015/103357
PCT Pub. Date: Jul. 9, 2015

(65) Prior Publication Data
US 2017/0159936 A1   Jun. 8, 2017

Related U.S. Application Data

(60) Provisional application No. 61/922,377, filed on Dec. 31, 2013.

(51) Int. Cl.
*F02C 7/18* (2006.01)
*F23R 3/00* (2006.01)
(Continued)

(52) U.S. Cl.
CPC ............... *F23R 3/002* (2013.01); *F02C 7/18* (2013.01); *F23R 3/005* (2013.01); *F23R 3/007* (2013.01); *F23R 3/06* (2013.01); *F01D 5/187* (2013.01); *F01D 25/12* (2013.01); *F05D 2220/32* (2013.01); *F05D 2240/15* (2013.01);
(Continued)

(58) Field of Classification Search
CPC ............ F23R 3/002; F23R 2900/03041; F23R 2900/03043; F23R 2900/03044; F23R 2900/03045; F02C 7/18; F01D 5/187; F01D 25/12; F05D 2240/15; F05D 2260/20; F05D 2260/2212; F05D 2260/2214; F05D 2260/22141
See application file for complete search history.

(56) References Cited

U.S. PATENT DOCUMENTS

| 5,435,139 A * | 7/1995 | Pidcock | F23R 3/002 |
| | | | 60/752 |
| 5,758,503 A | 6/1998 | DuBell et al. | |

(Continued)

OTHER PUBLICATIONS

Extended EP Search Report dated Dec. 9, 2016.

*Primary Examiner* — Gerald L Sung
*Assistant Examiner* — James McGlynn
(74) *Attorney, Agent, or Firm* — O'Shea Getz P.C.

(57) ABSTRACT

A liner panel is provided for use in a gas turbine engine. The liner panel includes an intermediate rail that extends from a cold side of a liner panel. The liner panel also includes a multiple of heat transfer augmentors, which generally decrease in height with respect to a distance from the intermediate rail.

20 Claims, 13 Drawing Sheets

(51) Int. Cl.
  *F23R 3/06* (2006.01)
  *F01D 5/18* (2006.01)
  *F01D 25/12* (2006.01)

(52) U.S. Cl.
  CPC ...... *F05D 2240/35* (2013.01); *F05D 2260/20* (2013.01); *F05D 2260/2212* (2013.01); *F05D 2260/2214* (2013.01); *F05D 2260/22141* (2013.01); *F23R 2900/00017* (2013.01); *F23R 2900/03041* (2013.01); *F23R 2900/03043* (2013.01); *F23R 2900/03044* (2013.01); *F23R 2900/03045* (2013.01); *Y02T 50/675* (2013.01)

(56) References Cited

U.S. PATENT DOCUMENTS

| | | |
|---|---|---|
| 5,775,108 A | 7/1998 | Ansart et al. |
| 5,775,589 A | 7/1998 | Vdoviak et al. |
| 6,282,905 B1 | 9/2001 | Sato et al. |
| 6,408,628 B1 | 6/2002 | Pidcock et al. |
| 7,938,624 B2 * | 5/2011 | Tibbott .............. F01D 5/187 415/115 |
| 8,024,933 B2 * | 9/2011 | Woolford ............. F23R 3/002 60/752 |
| 8,113,004 B2 | 2/2012 | Carlisle et al. |
| 8,256,224 B2 | 9/2012 | Garry et al. |
| 8,266,914 B2 | 9/2012 | Hawie et al. |
| 8,359,865 B2 | 1/2013 | Dierberger et al. |
| 8,359,866 B2 | 1/2013 | Dierberger et al. |
| 8,393,155 B2 | 3/2013 | Piper et al. |
| 8,408,010 B2 | 4/2013 | Garry et al. |
| 9,599,410 B2 * | 3/2017 | Antel, Jr. .............. B23P 15/26 |
| 2002/0116929 A1 | 8/2002 | Snyder |
| 2002/0184892 A1 | 12/2002 | Clavez et al. |
| 2007/0144178 A1 | 6/2007 | Burd et al. |
| 2007/0186558 A1 | 8/2007 | De Sousa et al. |
| 2007/0186559 A1 | 8/2007 | De Sousa et al. |
| 2007/0193216 A1 | 8/2007 | Woolford et al. |
| 2008/0063524 A1 | 3/2008 | Tibbott |
| 2008/0115506 A1 | 5/2008 | Patel et al. |
| 2009/0019854 A1 | 1/2009 | Simons et al. |
| 2010/0229563 A1 | 9/2010 | Woolford et al. |
| 2013/0055722 A1 | 3/2013 | Verhiel et al. |
| 2014/0096528 A1 * | 4/2014 | Cunha .............. F02C 7/18 60/755 |
| 2015/0369490 A1 * | 12/2015 | Cunha ............... F23R 3/002 60/752 |
| 2016/0327273 A1 * | 11/2016 | Cunha ............... F23R 3/005 |

\* cited by examiner

GAS TURBINE ENGINE WALL ASSEMBLY WITH ENHANCED FLOW ARCHITECTURE

CROSS-REFERENCE TO RELATED APPLICATION

This application claims priority to PCT Patent Application No. PCT/US14/072928 filed Dec. 31, 2014, which claims priority to U.S. Provisional Patent Application No. 61/922,377 filed Dec. 31, 2013, which are hereby incorporated herein by reference in their entireties.

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, relatively high temperatures are observed in the combustor section such that cooling airflow is provided to meet desired service life requirements. The combustor section typically includes a combustion chamber formed by an inner and outer wall assembly. Each wall assembly includes a support shell lined with heat shields often referred to as liner panels. In certain combustion architectures, dilution passages direct airflow to condition air within the combustion chamber.

In addition to the dilution passages, the shells may have relatively small air impingement passages to direct cooling air to impingement cavities between the support shell and the liner panels. This cooling air exits numerous effusion passages through the liner panels to effusion cool the passages and film cool a hot side of the liner panels to reduce direct exposure to the combustion gases.

With lower emissions requirements and higher combustor operational temperatures, effective sealing between the shell and liner panels may be of increased significance. However, the relatively large tolerances between the cast liner panels and sheet metal shell may complicate such effective sealing.

SUMMARY

A liner panel for use in a gas turbine engine, according to one disclosed non-limiting embodiment of the present disclosure, includes an intermediate rail that extends from a cold side of a liner panel. A multiple of heat transfer augmentors are included which generally decrease in height with respect to a distance from the intermediate rail.

In a further embodiment of the present disclosure, the multiple of heat transfer augmentors generally form a gothic arch architecture arrangement.

In a further embodiment of any of the foregoing embodiments of the present disclosure, an apex of a pointed arch of the gothic arch architecture arrangement is generally adjacent to the intermediate rail.

In a further embodiment of any of the foregoing embodiments of the present disclosure, an extrados of the pointed arch extends toward a forward circumferential rail.

In a further embodiment of any of the foregoing embodiments of the present disclosure, an extrados of the pointed arch extends toward an aft circumferential rail.

In a further embodiment of any of the foregoing embodiments of the present disclosure, the gothic arch architecture includes a multiple of nested pointed arches.

In a further embodiment of any of the foregoing embodiments of the present disclosure, an apex of each of the multiple of nested pointed arches of the gothic arch architecture is arranged generally adjacent to the intermediate rail.

In a further embodiment of any of the foregoing embodiments of the present disclosure, an extrados of the multiple of nested pointed arches extend toward a forward circumferential rail.

In a further embodiment of any of the foregoing embodiments of the present disclosure, an extrados of the multiple of nested pointed arches extend toward an aft circumferential rail.

A wall assembly within a gas turbine engine, according to another disclosed non-limiting embodiment of the present disclosure, includes a liner panel and a support shell with a contoured region to define at least one convergent passage between the support shell and the liner panel. A multiple of heat transfer augmentors are also included that extend from the liner panel toward the support shell. Each of the multiple of heat transfer augmentors define a height that corresponds with the contoured region.

In a further embodiment of any of the foregoing embodiments of the present disclosure, an intermediate rail extends from the liner panel toward the support shell. The multiple of heat transfer augmentors decrease in height with respect to a distance from the intermediate rail.

In a further embodiment of any of the foregoing embodiments of the present disclosure, the multiple of heat transfer augmentors extend from the liner panel partially to the support shell.

In a further embodiment of any of the foregoing embodiments of the present disclosure, the multiple of heat transfer augmentors extend from the liner panel a distance about half-way to the support shell.

In a further embodiment of any of the foregoing embodiments of the present disclosure, the multiple of heat transfer augmentors extend from the liner panel to the support shell.

In a further embodiment of any of the foregoing embodiments of the present disclosure, the multiple of heat transfer augmentors generally form a gothic arch architecture arrangement.

In a further embodiment of any of the foregoing embodiments of the present disclosure, an apex of a pointed arch of the gothic arch architecture arrangement is generally adjacent to the intermediate rail.

In a further embodiment of any of the foregoing embodiments of the present disclosure, an extrados of the pointed arch extends toward a forward circumferential rail.

In a further embodiment of any of the foregoing embodiments of the present disclosure, an extrados of the pointed arch extends toward an aft circumferential rail.

A method of cooling a wall assembly for a gas turbine engine, according to another disclosed non-limiting embodiment of the present disclosure, includes directing cooling air into at least one convergent cavity between a support shell and a liner panel. The liner panel includes a multiple of heat transfer augmentors that extend from the liner panel toward the support shell. Each of the multiple of heat transfer augmentors define a height that corresponds with the contoured region.

In a further embodiment of any of the foregoing embodiments of the present disclosure, the method also includes orienting the multiple of heat transfer augmentors to form a gothic arch architecture arrangement with respect to an intermediate rail that extends from the liner panel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
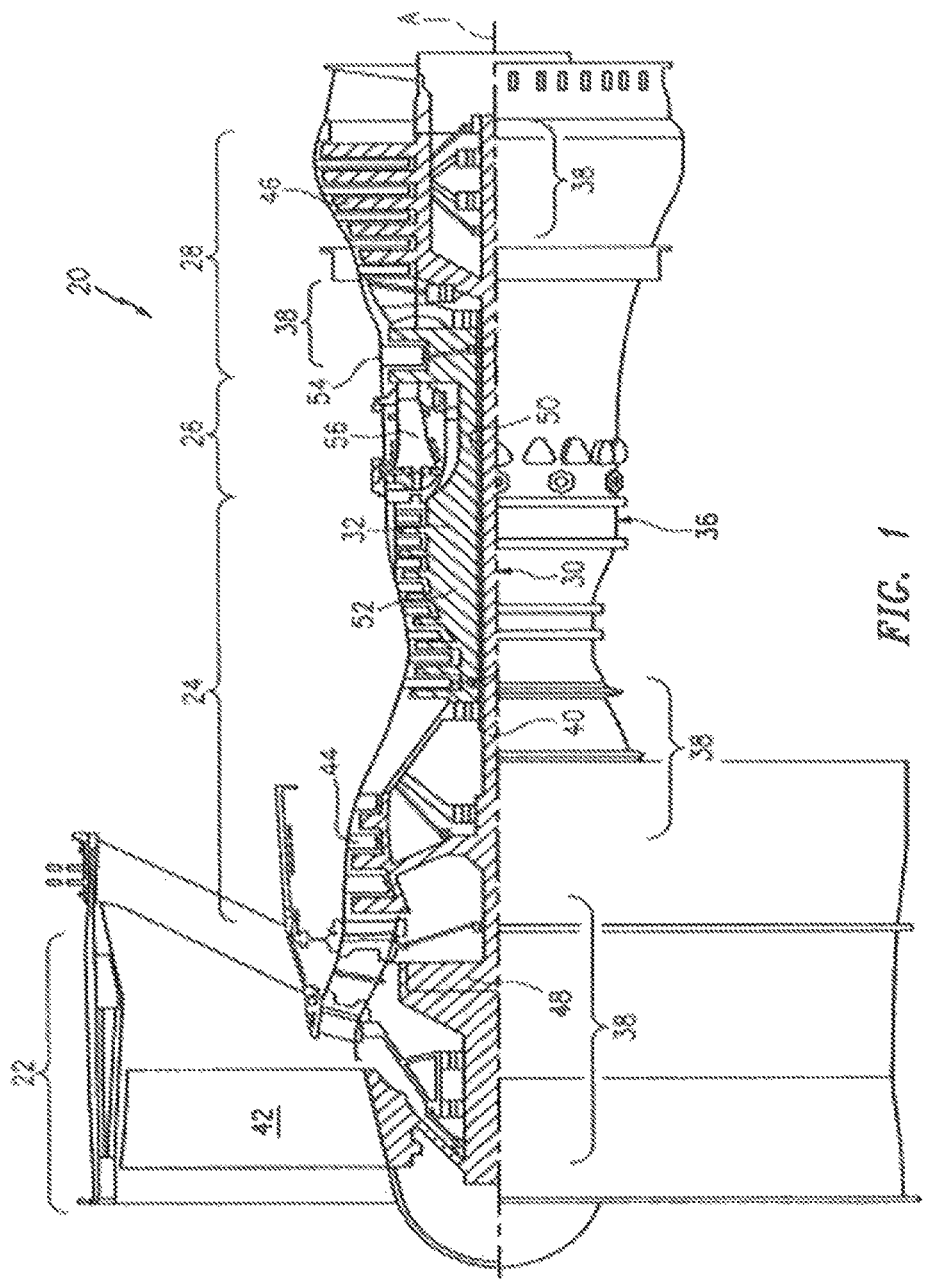
FIG. 1 is a schematic cross-section of an example gas turbine engine architecture.
Figure 2:
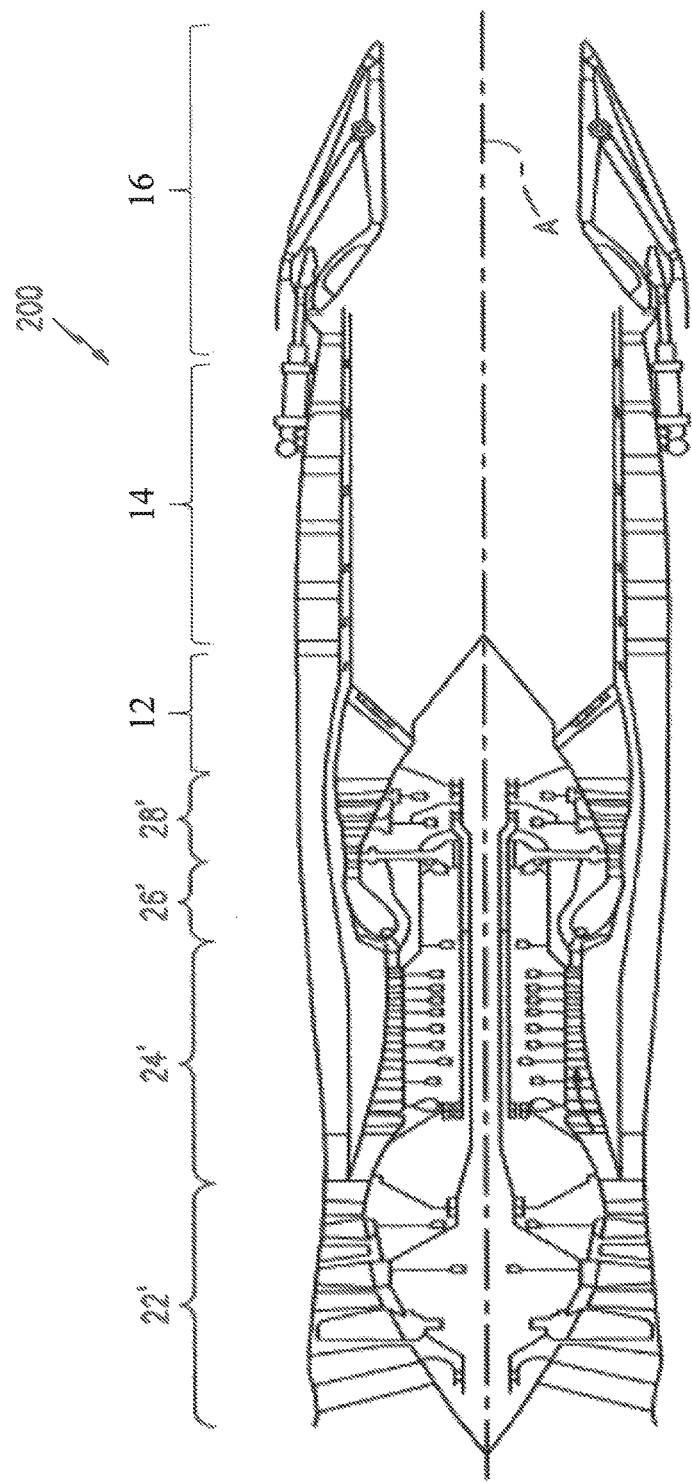
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and a nozzle section 16 in addition to the fan section 22', compressor section 24', combustor section 26' and turbine section 28' (FIG. 2) among other systems or features. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by bearing systems 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
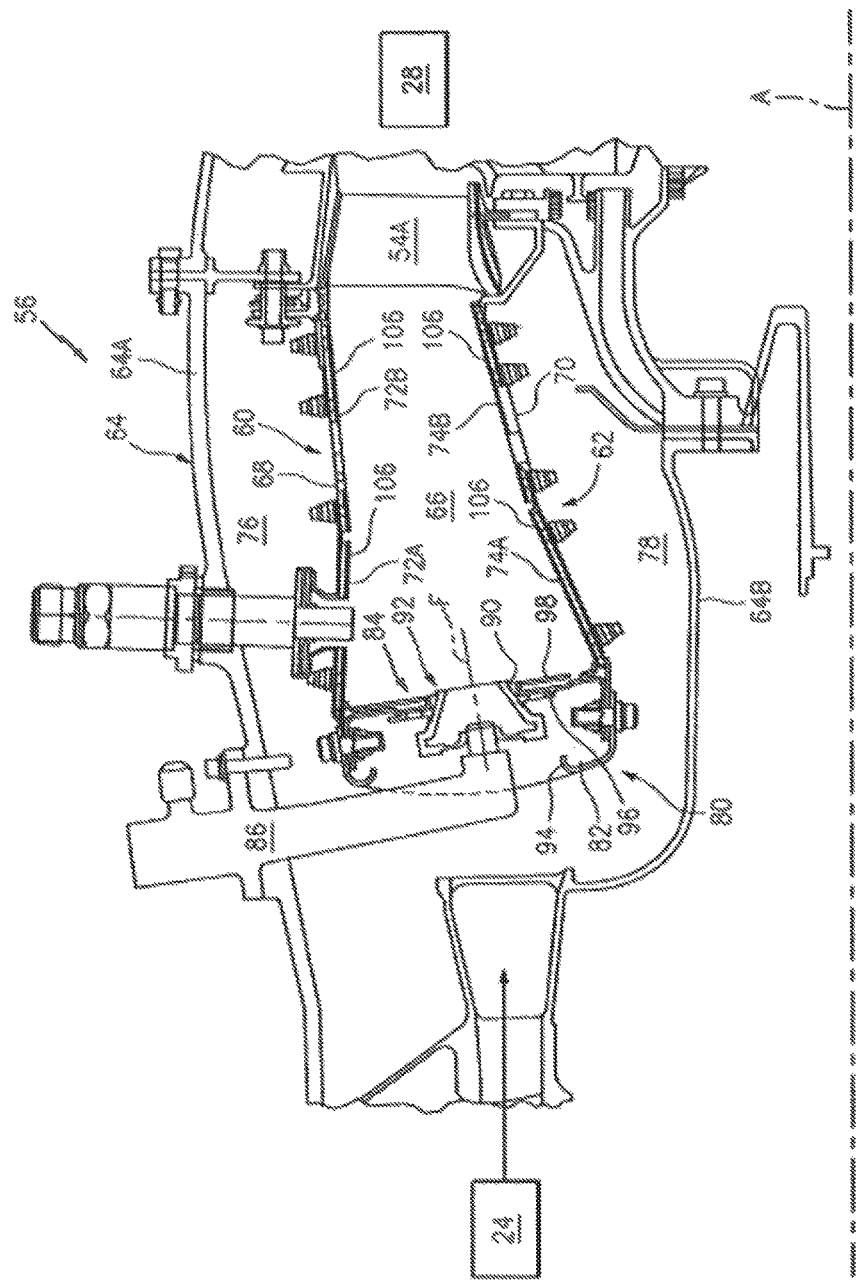
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor wall assembly 60, an inner combustor wall assembly 62 and a diffuser case module 64. The outer combustor wall assembly 60 and the inner combustor wall assembly 62 are spaced apart such that a combustion chamber 66 is defined therebetween. The combustion chamber 66 is generally annular in shape to surround the engine central longitudinal axis A.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto that are arranged to form a liner array. The support shells 68, 70 may be manufactured by, for example, the hydroforming of a sheet metal alloy to provide the generally cylindrical outer shell 68 and inner shell 70. Each of the liner panels 72, 74 may be generally rectilinear with a circumferential arc. The liner panels 72, 74 may be manufactured of, for example, a nickel based super alloy, ceramic or other temperature resistant material. In one disclosed non-limiting embodiment, the liner array includes a multiple of forward liner panels 72A and a multiple of aft liner panels 72B that are circumferentially staggered to line the outer shell 68. A multiple of forward liner panels 74A and a multiple of aft liner panels 74B are circumferentially staggered to line the inner shell 70.

The combustor 56 further includes a forward assembly 80 immediately downstream of the compressor section 24 to receive compressed airflow therefrom. The forward assembly 80 generally includes a cowl 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84.

The bulkhead assembly 84 includes a bulkhead support shell 96 secured to the combustor walls 60, 62, and a multiple of circumferentially distributed bulkhead liner panels 98 secured to the bulkhead support shell 96 around the swirler opening. The bulkhead support shell 96 is generally annular and the multiple of circumferentially distributed bulkhead liner panels 98 are segmented, typically one to each fuel nozzle 86 and swirler 90.

The cowl 82 extends radially between, and is secured to, the forwardmost ends of the combustor walls 60, 62. The cowl 82 includes a multiple of circumferentially distributed hood ports 94 that receive one of the respective multiple of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 and through the swirler opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
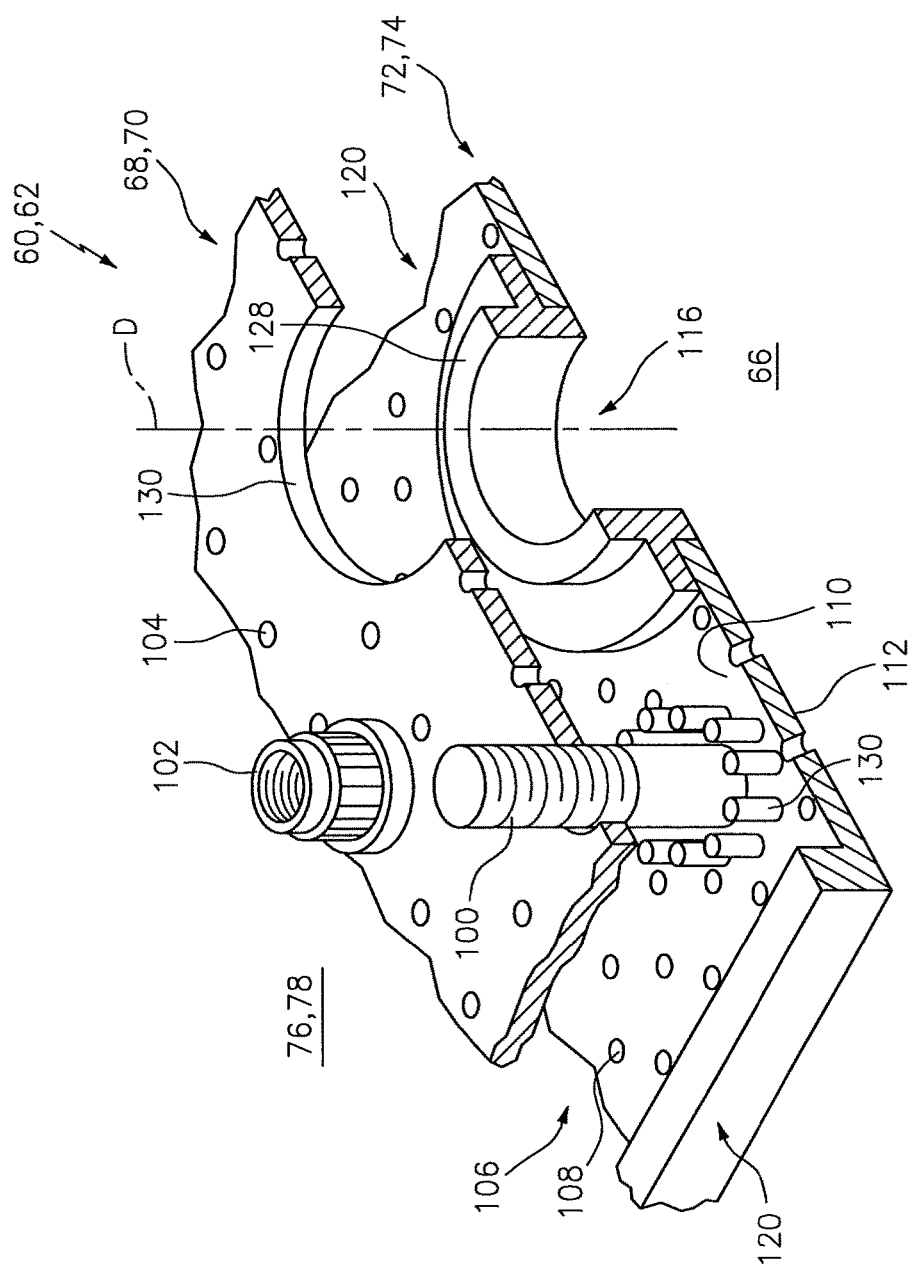
FIG. 4 is an exploded partial sectional view of a portion of a combustor wall assembly.
Figure 5:
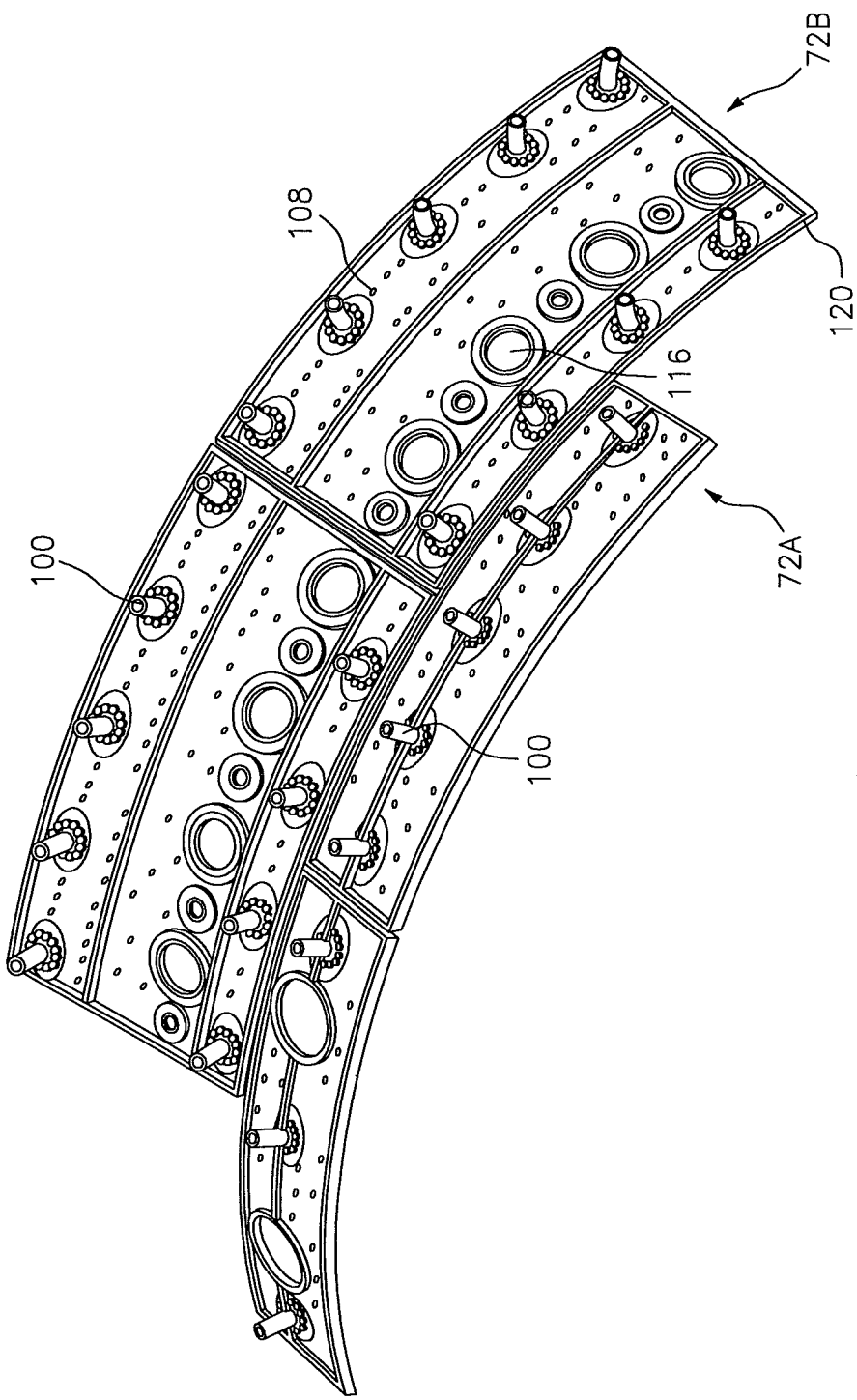
FIG. 5 is a cold side perspective view of a portion of a liner panel array.

With reference to FIG. 4, a multiple of studs 100 extend from each of the liner panels 72, 74 so as to permit an array (FIG. 5) of the liner panels 72, 74 to be mounted to their respective support shells 68, 70 with fasteners 102 such as nuts. That is, the studs 100 project rigidly from the liner panels 72, 74 and through the respective support shells 68, 70 to receive the fasteners 102 at a threaded section thereof.

A multiple of cooling impingement passages 104 penetrate through the support shells 68, 70 to allow air from the respective annular plenums 76, 78 to enter cavities 106 formed in the combustor walls 60, 62 between the respective support shells 68, 70 and liner panels 72, 74. The cooling impingement passages 104 are generally normal to the surface of the liner panels 72, 74. The air in the cavities 106 provide cold side impingement cooling of the liner panels 72, 74 that is generally defined herein as heat removal via internal convection.

A multiple of effusion passages 108 penetrate through each of the liner panels 72, 74. The geometry of the passages (e.g., diameter, shape, density, surface angle, incidence angle, etc.) as well as the location of the passages with respect to the high temperature main flow also contributes to effusion film cooling. The combination of impingement passages 104 and effusion passages 108 may be referred to as an Impingement Film Floatwall (IFF) assembly.

The effusion passages 108 direct air from the cavities 106, defined in part by a cold side 110 of the liner panels 72, 74, to a hot side 112 of the liner panels 72, 74 to facilitate the formation of a thin, cool, insulating blanket or film of cooling air along the hot side 112. The effusion passages 108 are generally more numerous than the impingement passages 104 to promote the development of film cooling along the hot side 112 to sheath the liner panels 72, 74. Film cooling as defined herein is the introduction of a relatively cooler air at one or more discrete locations along a surface exposed to a high temperature environment to protect that surface in the region of the air injection as well as downstream thereof.

A multiple of dilution passages 116 may penetrate through both the respective support shells 68, 70 and liner panels 72B, 74B along a common axis. For example only, in a Rich-Quench-Lean (R-Q-L) type combustor, the dilution passages 116 are located downstream of the forward assembly 80 to quench the hot combustion gases within the combustion chamber 66 by direct supply of cooling air from the respective annular plenums 76, 78.

Figure 6:
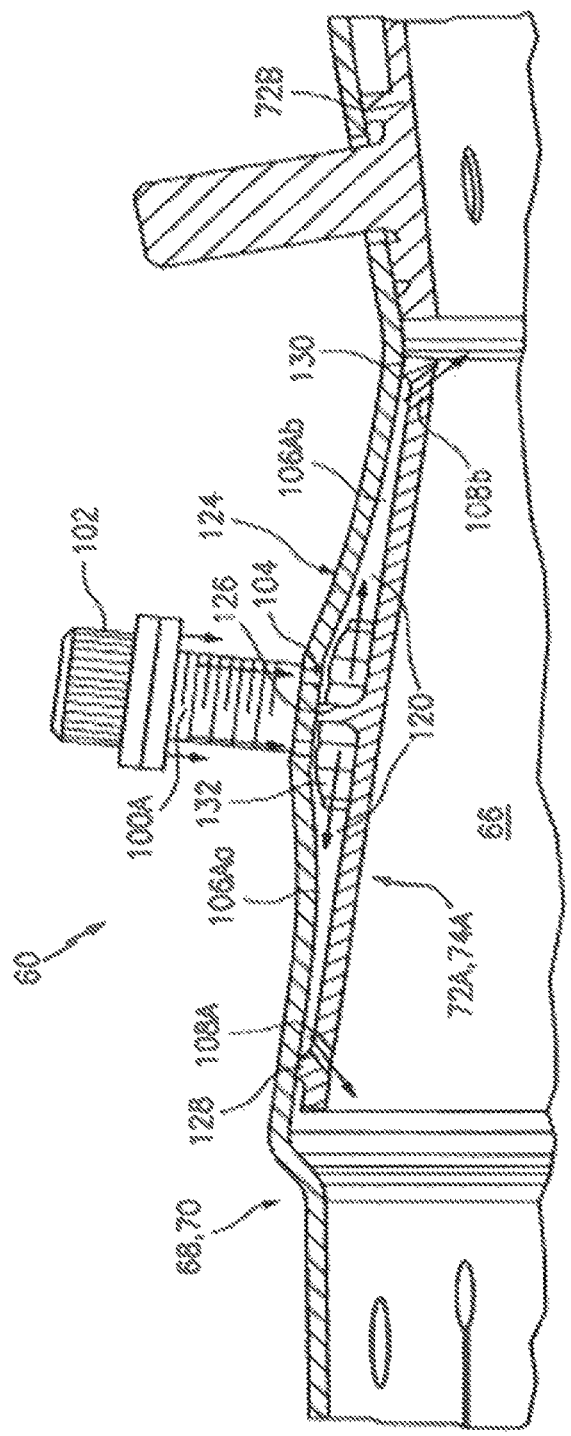
FIG. 6 is an expanded longitudinal sectional view of a forward outer portion of a combustor wall assembly illustrating a contoured region of a support shell according to one disclosed non-limiting embodiment.

With reference to FIG. 6, in one disclosed non-limiting embodiment, each of the respective support shells 68, 70 are at least partially non-parallel with respect to the forward liner panels 72A, 74A to form an axially forward and aft directed convergent passage 120 therebetween at a contoured region 124. That is, the contoured region 124 is a radially displaced profile section of the respective support shells 68, 70 proximate the forward liner panels 72A, 74A. Although the forward liner panels 72A, and the respective forward portion of the outer support shell 68 may be specifically described and illustrated in some of the following disclosed non-limiting embodiments, it should be appreciated that the inner support shell 70 as well as various other wall assemblies within a gas turbine engine such as within the walls of the augmentor section 12, the exhaust duct section 14 and/or the nozzle section 16 (see FIG. 2) may alternatively or additionally, be benefit herefrom. That is, the contoured region 124 may alternatively or additionally located within engine sections other than the combustor section 26.

The contoured regions 124 form the one or more convergent passages 120 by provision of a non-linear axial profile of the combustor shell adjacent to the respective liner panels. Various contours and configurations are possible to tailor the location of the effusion air exit, and optimize heat transfer, pressure loss, manufacturability, NOx reduction, etc. Beneficially, the contoured regions 124 do not require additional hardware over conventional float wall combustor panels to form the convergence and are readily produced with current manufacturing methods.

In one disclosed non-limiting embodiment, the contoured region 124 of the support shell 68, 70 defines a hyperbolic cosine (COSH) profile in longitudinal cross-section that extends radially away from the forward liner panels 72A, 74A. That is, the forward liner panels 72A, 74A are generally linear in longitudinal cross-section, while the contoured region 124 is generally non-linear in longitudinal cross-section. For perspective, in this disclosed non-limiting embodiment, each of the forward liner panels 72A define an axial length of about 1.5 inches (38 mm) and each may extend over a circumferential arc of about forty-five (45) degrees (one shown in FIGS. 7 and 8).

With continued reference to FIG. 6, the contoured region 124 may be located adjacent to a row of studs 100A and an intermediate circumferential rail 126 located between a forward circumferential rail 128 and an aft circumferential rail 130. Each of the studs 100A may be at least partially surrounded by posts 132 to at least partially support the fastener 102 and operate as stand-offs between the support shell 68 and the forward liner panels 72A.

Figure 7:
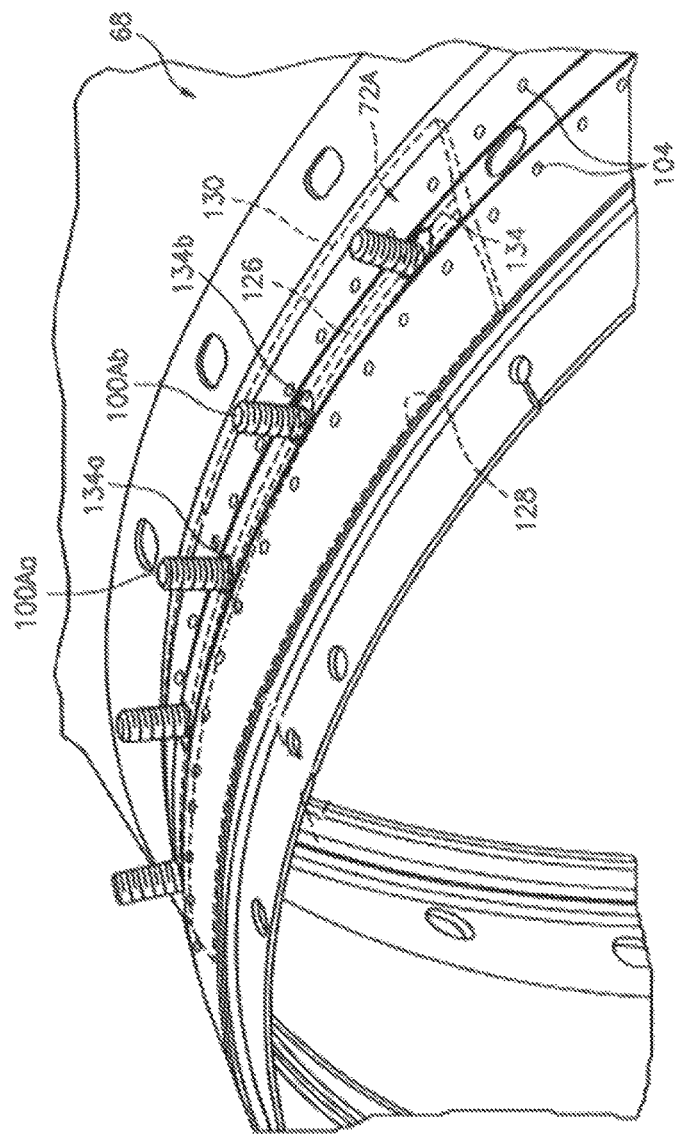
FIG. 7 is a perspective partial phantom view of one forward outer liner panel mounted to a support shell.

Each of the forward liner panels 72A, in one disclosed non-limiting embodiment, includes a single row of studs 100A (Five shown) that extend through respective stud apertures 134 in the support shell 68 (see FIG. 7). A center or "king" stud 100Aa is received within a central circular stud aperture 134a while the remainder of the studs 100Ab are received within elongated apertures 134b to facilitate operational thermal growth relative to the center or "king" stud 100Aa (see FIG. 7).

With continued reference to FIG. 6, the convergent cavity 120 forms a cavity 106A that converges toward in the support shell 68, 70 the forward circumferential rail 128 and the aft circumferential rail 130. The intermediate circumferential rail 126 further subdivides the cavity 106A into a forward convergent cavity 106Aa and an aft convergent cavity 106Ab. The forward cavity 106Aa and the aft cavity 106Ab thereby accelerate and direct impingement airflow from impingement passages 104 (also shown in FIG. 7) on each respective side of the intermediate circumferential rail 126 toward forward effusion apertures 108a and aft effusion apertures 108b. The forward effusion apertures 108a and the aft effusion apertures 108b may define respective angles through the forward liner panels 72A to respectively direct effusion airflow generally forward and aft into the combustion chamber 66. It should be appreciated that various contours and configurations are possible to tailor the location of the effusion air passages to optimize heat transfer, pressure loss, manufacturability, etc., without need for additional hardware between the respective support shell 68 and the forward liner panels 72A.

Axial end rails 136 circumferentially close-out each forward liner panel 72A with respect to the support shell 68. That is, the forward circumferential rail 128 and the aft circumferential rail 130 are located at relatively constant curvature axial interfaces while the axial end rails 136 extend across an axial length of the support shell 68 to complete a perimeter rail 138 that seals the periphery of each forward liner panels 72A with respect to its support shell 68.

Figure 8:
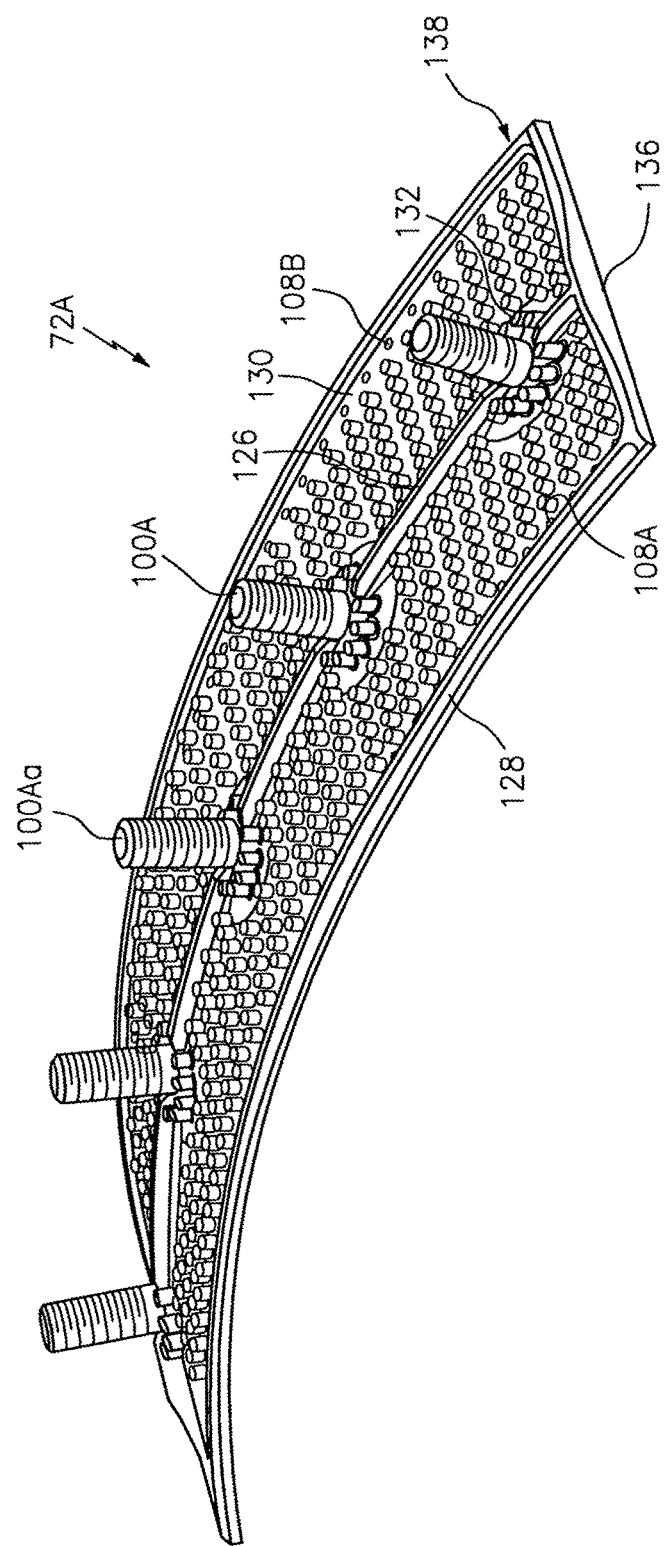
FIG. 8 is a perspective view of a liner panel according to one disclosed non-limiting embodiment.

With reference to FIG. 8, in one disclosed non-limiting embodiment, the multiple of studs 100A extend from the intermediate rail 126. That is, the studs 100A are aligned with, and may at least partially form, the intermediate rail 126. It should be appreciated that the studs 100A may also at least partially extend from the cold side 110. That is, the relatively cylindrical studs 100A form a footprint greater than the intermediate rail 126 and may thereby also extend in part from the cold side. In this disclosed non-limiting embodiment, each of the studs 100A may be at least partially surrounded by posts 132 which extend from the cold side 110 to at least partially support the fastener 102. Location of studs 100 on the intermediate rails 126 facilitates an effective seal between the liner panels 72, 74 and respective support shell 68, 70 that reduces leakage to facilitate formation of a relatively larger pressure drops across the liner panels 72, 74 and thereby increase cooling effectiveness.

Figure 9:
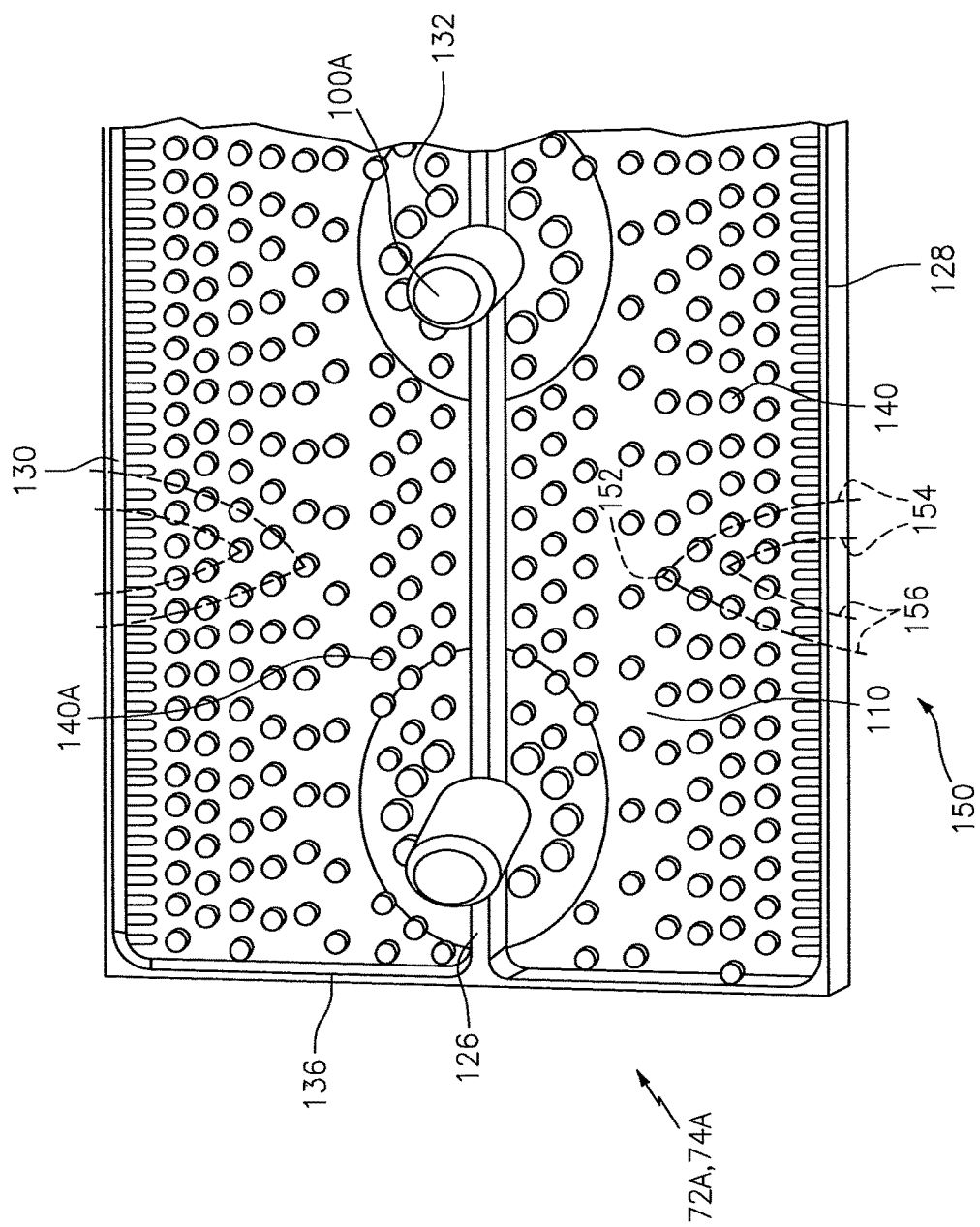
FIG. 9 is an expanded perspective view of the liner panel of FIG. 8.

With reference to FIG. 9, in one disclosed non-limiting embodiment, a multiple of heat transfer augmentors 140 such as hemispherical dimples, chevron type, cylindrical pins, or other geometries extend from the cold side 110 of each liner panel 72A, 74A. The liner panels 72A, 74A may be manufactured via an additive manufacturing process that facilitates incorporation of the relatively small heat transfer augmentors 140 as well as other features. One additive manufacturing process includes powder bed metallurgy in which layers of powder alloy such as nickel, cobalt, or other material is sequentially build-up by systems from, for example, Concept Laser of Lichtenfels, Del. and EOS of Munich, Del., e.g. direct metal laser sintering or electron beam melting.

Cooling air is introduced between the between the support shell 68, 70 and the respective liner panels 72A, 74A from the respective outer and inner annular plenum 76, 78. This cooling flow proceeds from the impingement passages 104 which flank the intermediate rail 126, through the respective forward convergent cavity 106Aa and the aft convergent cavity 106Ab, then discharged through respective effusion passages 108 adjacent to the respective forward circumferential rail 128 and the aft circumferential rail 130. That is, the cooling air discharge is at the forward and aft edges of each liner panel to reduce general film cooling.

Figure 10:
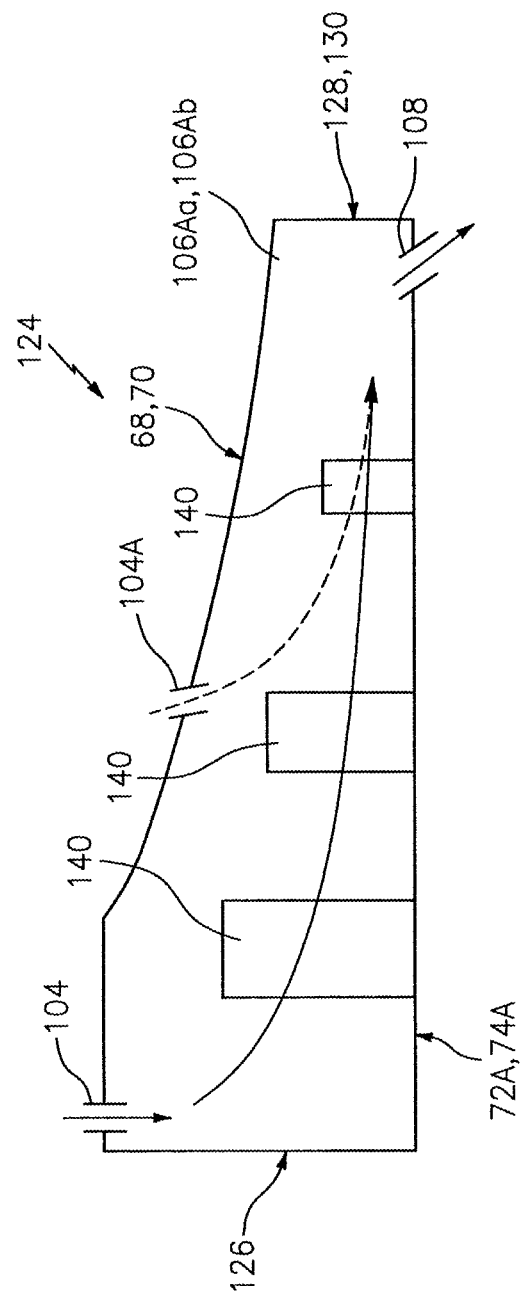
FIG. 10 is a schematic sectional view of airflow through a convergent passage formed by a wall assembly according to one disclosed non-limiting embodiment.

The forward convergent cavity 106Aa and the aft convergent cavity 106Ab generates a relatively strong impingement flow. That is, the contoured region 124 of the support shell 68, 70 reduces the degree of freedom of the cooling flow otherwise generated from the impingement passages 104 (see FIG. 10) to generate a more focused impingement flow. In another disclosed non-limiting embodiment one or more additional rows of impingement passages 104A (see FIG. 10) may be located downstream of the impingement passages 104 which flank the intermediate rail 126 to further energize this impingement flow. In this disclosed non-limiting embodiment, the additional rows of impingement passages 104A are located intermediate the intermediate rail 126 and the respective forward circumferential rail 128 and the aft circumferential rail 130 (see FIG. 10).

The relatively small heat transfer augmentors 140 extend from the cold side 110 within the respective forward convergent cavity 106Aa and the aft convergent cavity 106Ab over which the relatively strong impingement flow passes. The multiple of heat transfer augmentors 140 increase surface area, promote turbulence, increase thermal efficiency, and facilitates film cooling as the spent impingement flow follows the direction towards effusion passages 108. In general, flow transition from the stagnation impingement flow to turbulent flow follows the mechanism associated with turbulence creation through unstable Tollmien-Schiliting waves, three-dimensional instability, then by vortex breakdown in a cascading process which leads to intense flow fluctuations and energy exchange or high heat transfer. This natural process, facilitated by the multiple of heat transfer augmentors 140, provides high energy exchange, turbulence, coalescence of turbulence and redirection of flow towards more sensitive heat transfer areas, along with flow reattachment.

Figure 11:
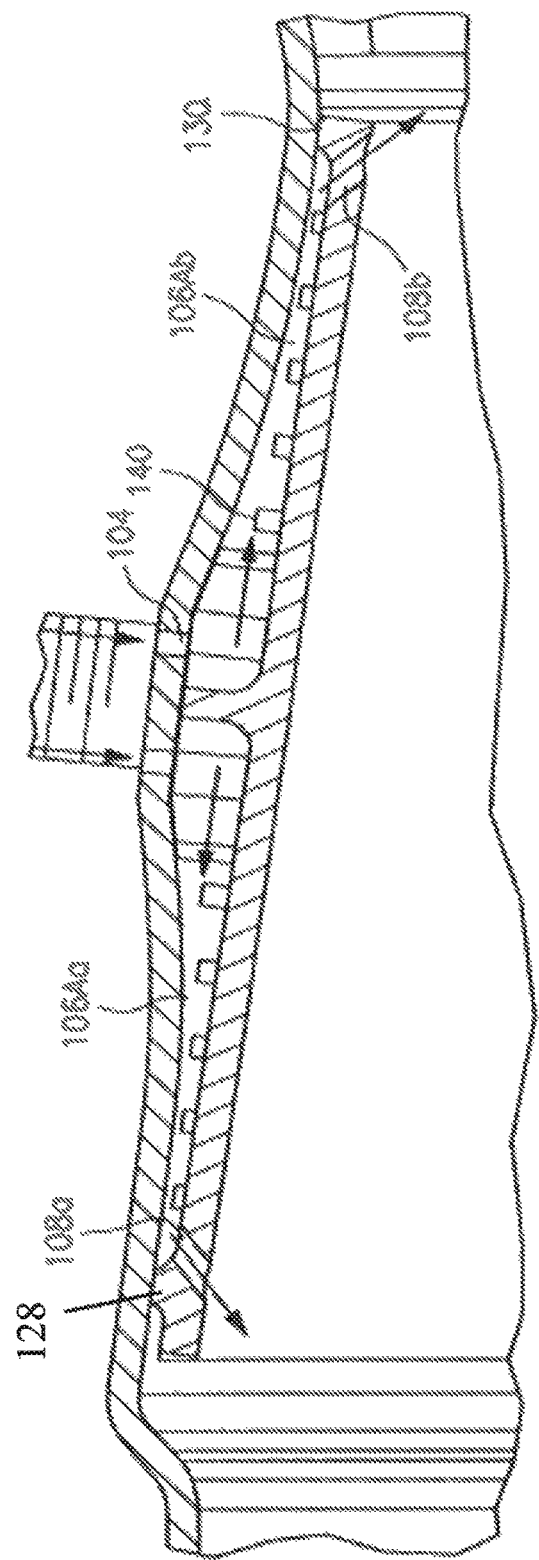
FIG. 11 is an expanded longitudinal sectional view of a forward outer portion of a combustor wall assembly illustrating a contoured region of a support shell according to another disclosed non-limiting embodiment.

With continued reference to FIG. 9, in one disclosed non-limiting embodiment, the heat transfer augmentors 140 extend from the cold side 110 for an about half-height of the respective forward convergent cavity 106Aa and the aft convergent cavity 106Ab. That is, the half-height heat transfer augmentors 140 extend from the cold side 110 of the liner panel 72A, 74A about half way to the respective the support shell 68, 70 and follow the profile of the contoured region 124 of the support shell 68, 70 (see FIG. 11). In other words, the multiple of heat transfer augmentors 140 generally decrease in height with respect to a distance from the intermediate rail 126.

In this disclosed non-limiting embodiment, the heat transfer augmentors 140 are arranged in accordance with the following formulas:

$$\left(\frac{S_n}{H}\right) \sim 3 \quad [1]$$

$$\left(\frac{S_n}{S_p}\right) \sim 0.7 \quad [2]$$

$$\left(\frac{h_p}{H}\right) \sim \frac{1}{2} \quad [3]$$

Where, Sn is a transverse spacing of the heat transfer augmentors 140 generally transverse to the cooling airflow;

H is the local height of the convergent cavity 106Aa, 106Ab;

Hp is the height of each heat transfer augmentor 140;

Sp is an axial spacing of the heat transfer augmentors 140 generally parallel to the cooling airflow;

dp is a diameter of each heat transfer augmentor 140.

In this disclosed non-limiting embodiment, the heat transfer augmentors 140 are arranged in a generally gothic arch architecture 150 in which the pointed apex 152 of each pointed arch 154 formed by the multiple of heat transfer augmentors 140 thereof are arranged generally adjacent to the intermediate rail 126 and the extrados 156 therefrom extend toward the respective forward circumferential rail 128 and the aft circumferential rail 130. The generally gothic arch architecture 150 may include numerous pointed arches 154 which are arranged in a nested arrangement. As described above, the heat transfer augmentors 140 in one disclosed non-limiting embodiment, extend from the cold side 110 to generally follow the profile of the contoured region 124 of the support shell 68, 70. It should be appreciated that half-height, full-height as well as other heights and combinations thereof may alternatively be utilized.

The apex 152 of at least some of the outermost pointed arches 154 may extend into or form a portion of a multiple of impingement target heat transfer augmentors 140A—here shown as three (3) parallel rows which flank the intermediate rail 126. The impingement target heat transfer augmentors 140A are the features generally adjacent to the impingement passages 104. The multiple of cooling impingement the passages 104 penetrate through the support shells 68, 70 to allow air from the respective annular plenums 76, 78 to impinge onto the target heat transfer augmentors 140A such that the impingement air will at least partially turbulate.

Figure 12:
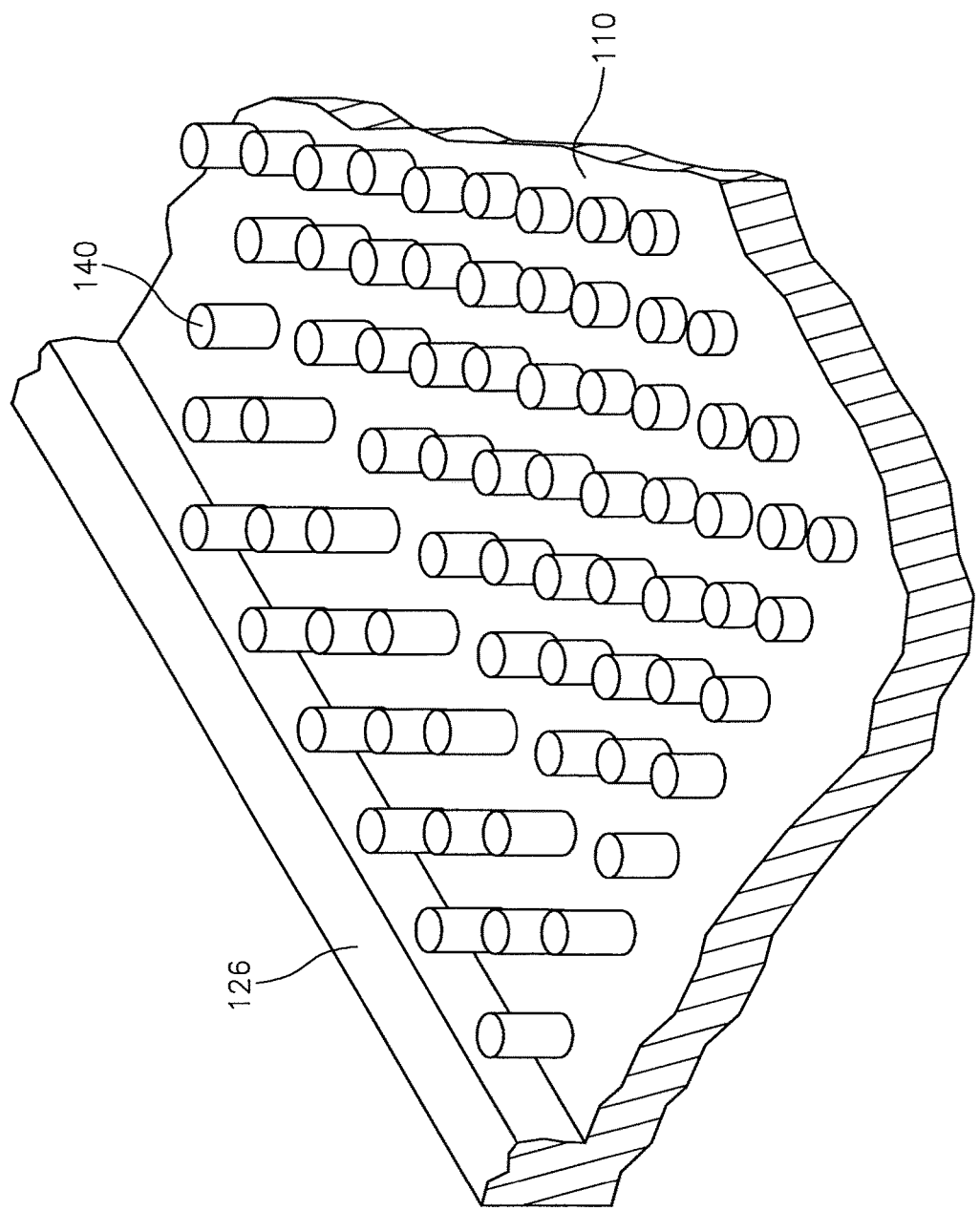
FIG. 12 is a perspective view of a forward outer liner panel of a combustor wall assembly according to another disclosed non-limiting embodiment.

With Reference to FIG. 12, in this disclosed non-limiting embodiment, the heat transfer augmentors 140 are arranged in accordance with the following formulas:

$$\left(\frac{S_n}{d_p}\right) \sim 3 \quad [4]$$

$$\left(\frac{S_n}{S_p}\right) \sim 1 \quad [5]$$

$$\left(\frac{h_p}{H}\right) \sim \frac{1}{2} \quad [6]$$

In this disclosed non-limiting embodiment, the half-height pins are arranged generally in rows. That is, no gothic arch architecture is provided.

Figure 13:
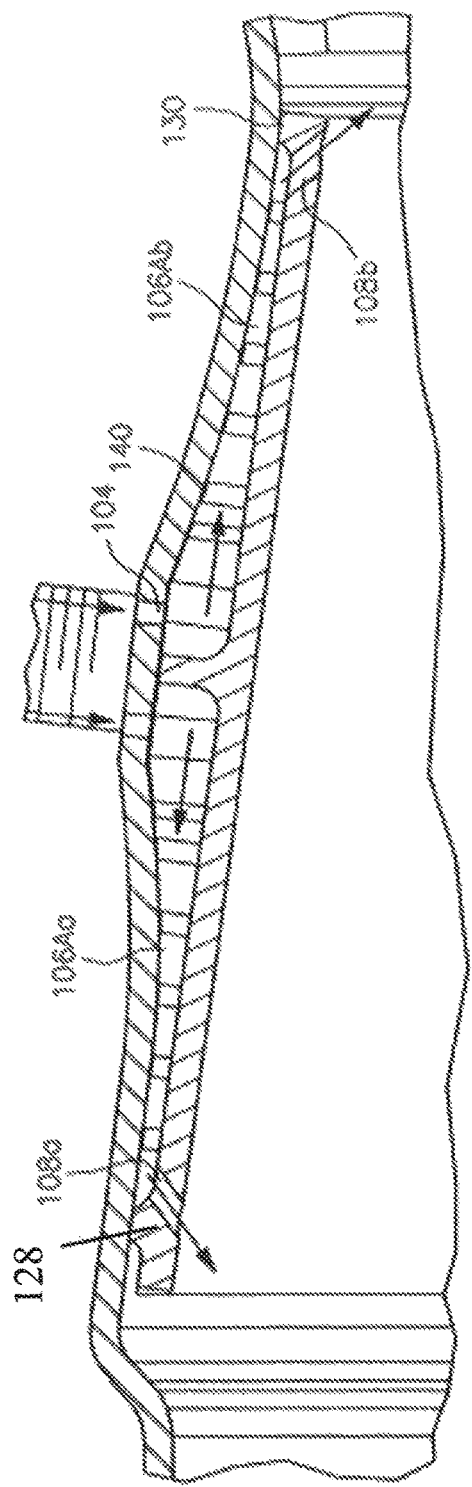
FIG. 13 is an expanded longitudinal sectional view of a forward outer portion of a combustor wall assembly illustrating a contoured region of a support shell according to one disclosed non-limiting embodiment.

With Reference to FIG. 13, in another disclosed non-limiting embodiment, the heat transfer augmentors 140 are arranged in accordance with the following formulas:

$$\left(\frac{S_n}{d_p}\right) 4 \quad [7]$$

$$\left(\frac{S_n}{S_p}\right) \sim 1 \quad [8]$$

$$\left(\frac{h_p}{H}\right) \sim 1 \quad [9]$$

In this disclosed non-limiting embodiment, the heat transfer augmentors 140 extend from the cold side 110 for the full height of the respective forward convergent cavity 106Aa and the aft convergent cavity 106Ab. That is, the full-height heat transfer augmentors 140 extend from the cold side 110 of the liner panel 72, 74 proximate to the respective the support shell 68, 70. That is, the full-height heat transfer augmentors 140 extend from the cold side 110 across the forward convergent cavity 106Aa and the aft convergent cavity 106Ab to follow the profile of the of the contoured region 124 of the support shell 68, 70. The full-height heat transfer augmentors 140 may form a gap, i.e., pre-assembly gap, that for example, may be about 0.005-0.020 inches (0.1-0.5 mm), that is closed in response to deflection of the contoured region 124 as the fasteners 102 are tightened onto the studs 100. As the fasteners 102 are tightened down, the sheet metal support shell 68, 70 slightly elastically deform against the full-height heat transfer augmentors 140. The fasteners 102 thereby close the gap such that the contoured region 124 closely follows the axial end rails 136 to circumferentially close-out and form an interference fit between each of the forward liner panels 72A, 74A with respect to the associated support shell 68, 70. It should be appreciated that fasteners such as clips and mechanisms other than threads may alternatively or additionally be utilized to minimize leakage from both the neighboring rail and adjacent rails.

It should be appreciated that the heat transfer augmentors 140 may be combined in various manners, full-height, half-height, gothic arch architecture, row architecture as well as others. That is, it is possible to use some of these arrangements from any of the non-limiting embodiments may be arranged in combination from any of the other non-limiting embodiments.

The cooling concept takes advantage of one or more rows of impingement passages jet (with high heat transfer coefficient at the stagnation region followed by forced flow through a convergent. The cooling air passes over the heat transfer augmentors, such as hemispherical dimples, "chevrons" type features and cylindrical pins. The heat transfer augmentors ameliorate the apparent conflict between cooling air in a combustor environment. This design balances desirable cooling air for cooling the combustor walls; while preventing excessive NOX emissions, Reduces emissions, increases durability and time-on-wing for improved reliability.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A liner panel for use in a gas turbine engine, the liner panel comprising:
    a forward circumferential rail, an intermediate rail, and an aft circumferential rail that each extend from a cold side of the liner panel; and
    a multiple of heat transfer augmentors,
    wherein the multiple of heat transfer augmentors decrease in height with respect to a distance from the intermediate rail to the forward circumferential rail and the aft circumferential rail.

2. The liner panel as recited in claim 1, wherein the multiple of heat transfer augmentors generally form a gothic arch architecture arrangement.

3. The liner panel as recited in claim 2, wherein an apex of a pointed arch of the gothic arch architecture arrangement is generally adjacent to the intermediate rail.

4. The liner panel as recited in claim 3, wherein an extrados of the pointed arch extends toward the forward circumferential rail.

5. The liner panel as recited in claim 3, wherein an extrados of the pointed arch extends toward the aft circumferential rail.

6. The liner panel as recited in claim 2, wherein the gothic arch architecture arrangement includes a multiple of nested pointed arches.

7. The liner panel as recited in claim 6, wherein an apex of each of the multiple of nested pointed arches of the gothic arch architecture arrangement is arranged generally adjacent to the intermediate rail.

8. The liner panel as recited in claim 7, wherein an extrados of the multiple of nested pointed arches extend toward the forward circumferential rail.

9. The liner panel as recited in claim 7, wherein an extrados of the multiple of nested pointed arches extend toward the aft circumferential rail.

10. A wall assembly within a gas turbine engine, the wall assembly comprising:
    a liner panel;
    a support shell with a contoured region to define at least one convergent passage between the support shell and the liner panel;

a multiple of heat transfer augmentors that extend from the liner panel toward the support shell; and a forward circumferential rail, an intermediate rail, and an aft circumferential rail that each extend from the liner panel toward the support shell, wherein the multiple of heat transfer augmentors decrease in height with respect to a distance from the intermediate rail to the forward circumferential rail and the aft circumferential rail, the decrease in height corresponding with the contoured region.

11. The wall assembly as recited in claim 10, wherein the multiple of heat transfer augmentors extend from the liner panel partially to the support shell.

12. The wall assembly as recited in claim 10, wherein the multiple of heat transfer augmentors extend from the liner panel a distance about half-way to the support shell.

13. The wall assembly as recited in claim 10, wherein the multiple of heat transfer augmentors extend from the liner panel to the support shell.

14. The wall assembly as recited in claim 10, wherein the multiple of heat transfer augmentors generally form a gothic arch architecture arrangement.

15. The wall assembly as recited in claim 14, wherein an apex of a pointed arch of the gothic arch architecture arrangement is generally adjacent to the intermediate rail.

16. The wall assembly as recited in claim 15, wherein an extrados of the pointed arch extends toward the forward circumferential rail.

17. The wall assembly as recited in claim 15, wherein an extrados of the pointed arch extends toward the aft circumferential rail.

18. The wall assembly as recited in claim 10, wherein the liner panel partially defines a combustion chamber, and wherein the multiple of heat transfer augmentors extend from a cold side of the liner panel in a direction that is away from the combustion chamber.

19. A method of cooling a wall assembly for a gas turbine engine, the method comprising:

directing cooling air into at least one convergent cavity between a support shell and a liner panel;

the liner panel including a multiple of heat transfer augmentors that extend from the liner panel toward the support shell; and a forward circumferential rail, an intermediate rail, and an aft circumferential rail that each extend from the liner panel toward the support shell, wherein the multiple of heat transfer augmentors decrease in height with respect to a distance from the intermediate rail to the forward circumferential rail and the aft circumferential rail.

20. The method as recited in claim 19, further comprising orienting the multiple of heat transfer augmentors to form a gothic arch architecture arrangement with respect to the intermediate rail.

* * * * *